United States Patent [19]

Massonnet

[11] Patent Number: 4,735,459
[45] Date of Patent: Apr. 5, 1988

[54] WHEEL SYSTEM ADAPTED TO BE RAPIDLY DISMANTLED FROM A SUPPORT

[76] Inventor: Henry Massonnet, FR - 01760 Nurieux-Volognat, France

[21] Appl. No.: 877,356

[22] Filed: Jun. 23, 1986

[30] Foreign Application Priority Data

Jun. 28, 1985 [FR] France .................. 85 10118

[51] Int. Cl.⁴ .................. A47B 91/06; B60B 1/00
[52] U.S. Cl. .................. 301/1; 301/5 R; 301/63 PW; 301/111; 16/30; 16/45
[58] Field of Search .......... 301/1, 5 R, 63 R, 63 PW, 301/111, 38 R, 105 R; 16/18 R, 30, 33, 45, 46; 403/316; 248/225.1, 225.2

[56] References Cited

U.S. PATENT DOCUMENTS 3,869,105 3/1975 Daniels .................. 16/18 R X
3,977,040 8/1976 Sugasawara .................. 16/30 X
4,340,198 7/1982 Meinunger .................. 248/225.1 X

FOREIGN PATENT DOCUMENTS 3602475 8/1986 Fed. Rep. of Germany .......... 16/30

Primary Examiner—Robert B. Reeves
Assistant Examiner—Russell D. Stormer
Attorney, Agent, or Firm—Dowell & Dowell

[57] ABSTRACT

A wheel support system for articles of furniture and the like wherein the wheels are adapted to be readily dismantled from their support to thereby permit stacking of the furniture and wherein the wheels are engageable in vertical notches which are offset at the base of the legs of the furniture in such a manner that the wheels engage the lowermost portion of the legs and are rotatable with respect thereto.

8 Claims, 3 Drawing Sheets ically to the panel. In

WHEEL SYSTEM ADAPTED TO BE RAPIDLY DISMANTLED FROM A SUPPORT

BACKGROUND OF THE INVENTION

1. Field of the Invention

The present invention relates to a wheel system adapted to be dismantled very rapidly from a support such as the legs of a reclining chair or the like.

2. History of the Related Art

It is known that individuals appreciate reclining chairs for sunbathing which may be moved like a wheelbarrow or rolled on two wheels associated with the front or rear feet or legs of the chair or other article. However, when chairs are provided with wheels, it is virtually impossible to stack them unless the wheels are dismantled. It will be readily understood that such dismantling is tedious, with the result that it is not possible to accomplish the desired result.

SUMMARY OF THE INVENTION

It is an object of the improvements forming the subject matter of the present invention to produce a wheel system for lounge and other chairs which permits the wheels to be dismantled instantaneously and without using any tool.

The wheel system according to the invention is unique in that the wheels include vertically oriented annular webs which are receivable in vertical notches open towards the ground and which notches are made in an outwardly offset manner at the base of a leg or other support. The rounded bottom of the legs defines a stop against which part of the inner edge of the wheels bear, either when at rest or when the wheels rotate when the chair or other article of furniture is being moved.

Thus, when the wheels of the present invention are engaged in the vertical notches, their peripheral surface will rest against the ground, with the result that, by equipping the two corresponding legs of a reclining chair or the like for sunbathing, such chair may be moved like a wheelbarrow. When it is desired to stack such articles or chairs, it suffices to withdraw the wheels from their vertical notches and to engage the corresponding legs within one another.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
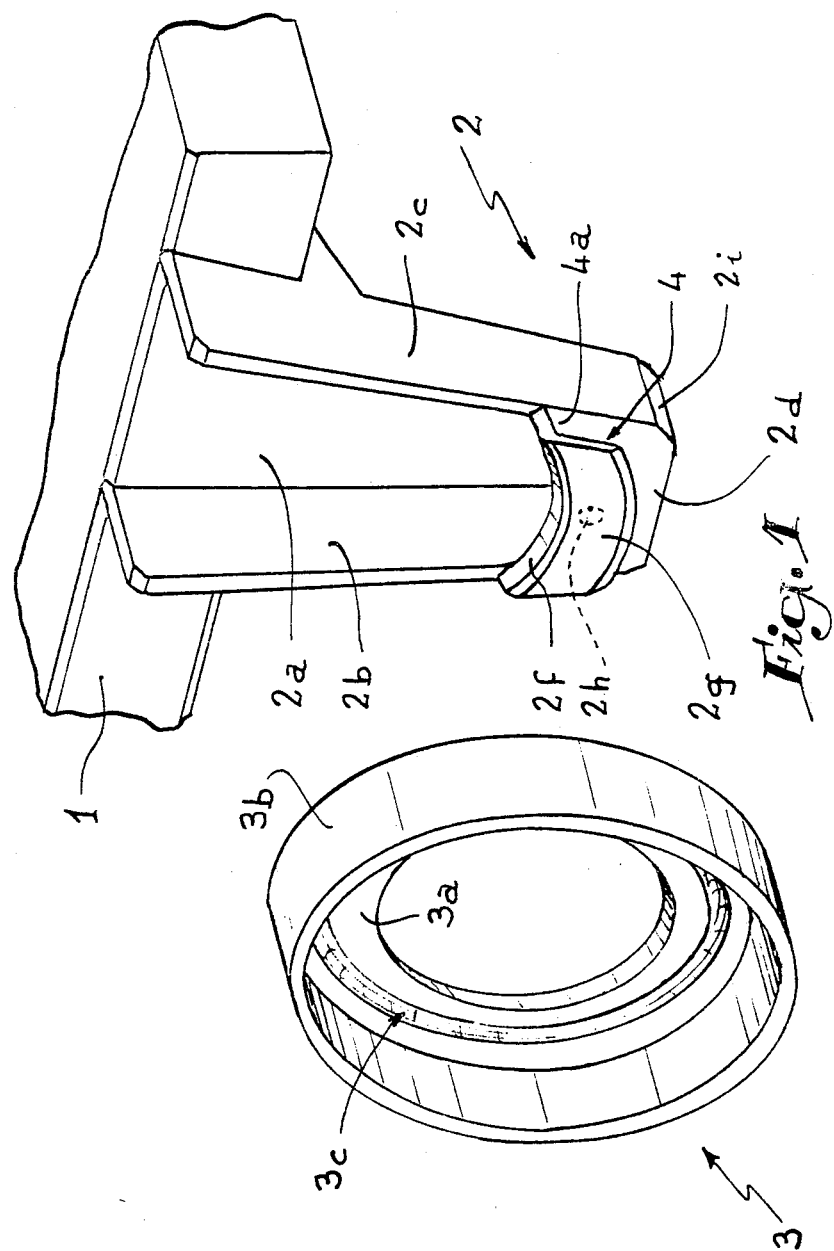
FIG. 1 is an exploded view in perspective of a wheel system adapted to be dismantled from the legs of a chair in accordance with the invention.

FIG. 1 partially illustrates the frame 1 of a chair provided with legs 2 with which it is desired to associte a wheel 3 in an easily dismountable manner. The frame 1 may constitute the principal element of a reclining chair or other article which is desired to be moved or manipulated like a wheelbarrow.

Each leg 2 comprises a small vertical panel 2a of trapezoidal form whose base constitutes the free end of the leg of a chair, chaise or other article of furniture. Two upwardly divergent oblique sides extend outwardly of the panel 2a and are identified as flanges 2b, 2c, which are oriented perpendicularly to the panel. In this way, leg 2 is recessed and outwardly open. The dimensions of the legs are such that the frames 1 may be stacked one on the other with their respective legs engaging in those of other frames.

The lower parts of the two flanges 2b, 2c are joined by a vertical wall 2d of which the free edge is upwardly concave. The edge extends inwardly from a vertical flange 2g which is oriented downwardly and parallel to wall 2d. In this way, flange 2g, partition 2f and wall 2d define a vertical notch 4 which is open downwardly with the upper portions thereof 4a being convex towards the ground.

Each wheel 3 includes an annular web 3a of which the periphery is associated with a rim 3b oriented perpendicularly thereto. Therefore, each wheel is in the form of a circular element whose sides include the web 3a and the rim 3b. The inner face of web 3a is provided with an annular groove 3c for purposes which will be better explained hereinbelow. It is noted that the inner periphery of web 3a defines an opening having a radius greater than that of the upper portion 4a of the notch 4, while the thickness is such as to enable the web 3a to be received within the notch 4.

Figure 2:
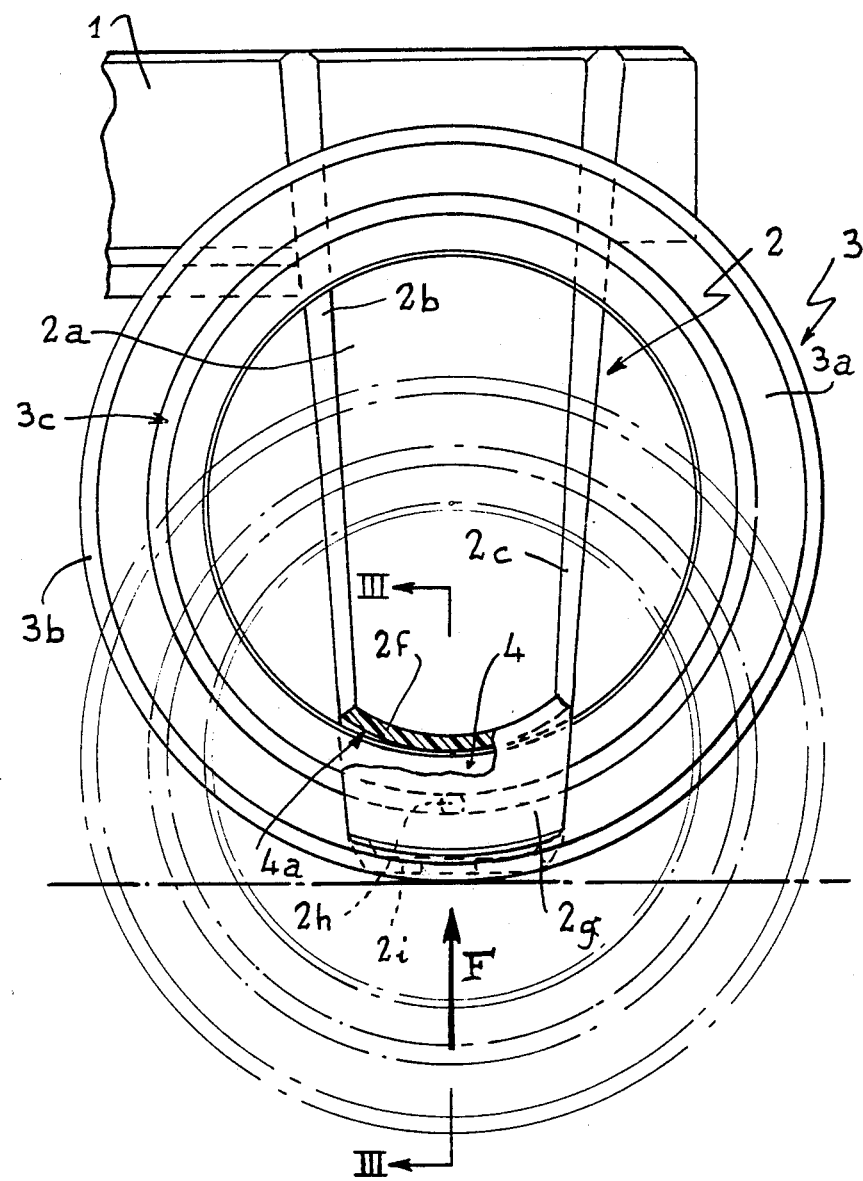
FIG. 2 is a side view having sections broken away showing the manner in which a wheel is placed in position with respect to a leg of a chair or other article of furniture.

From the foregoing description, it is observed that notch 4 is offset outwardly with respect to leg 2, with the result that the outer face of web 3a (not shown in FIG. 1) may be positioned against the edges of flanges 2b and 2c when flanges 2g is oriented in the central opening of the web so as to engage the web 3a between the flange 2g and the wall 2d of the leg 2, as illustrated in discontinuous lines in FIG. 2.

Figure 3:
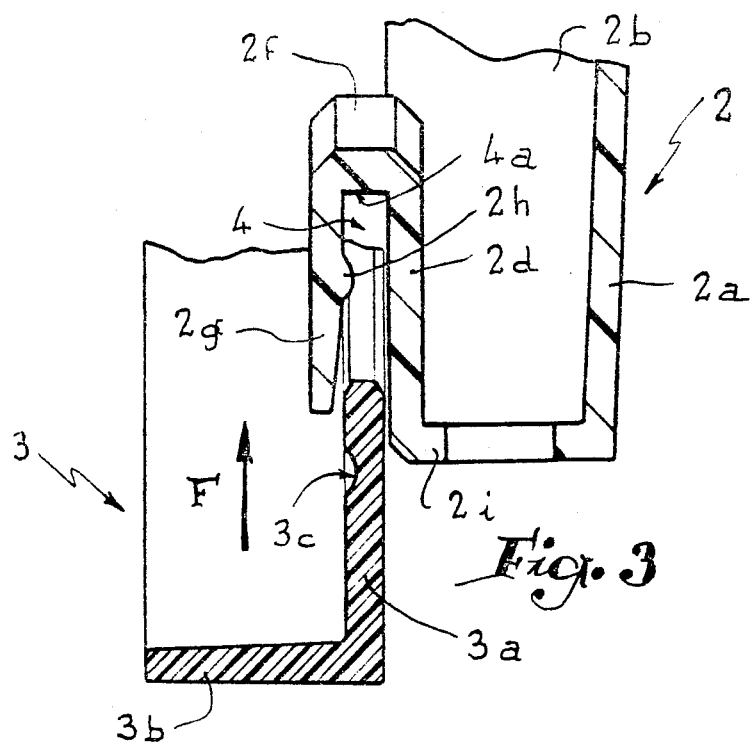
FIGS. 3 and 4 illustrate on an enlarged scale and in partial transverse section along lines III—III of FIG. 2, the two respective positions for a wheel with respect to a chair or other article of furniture.
Figure 4:
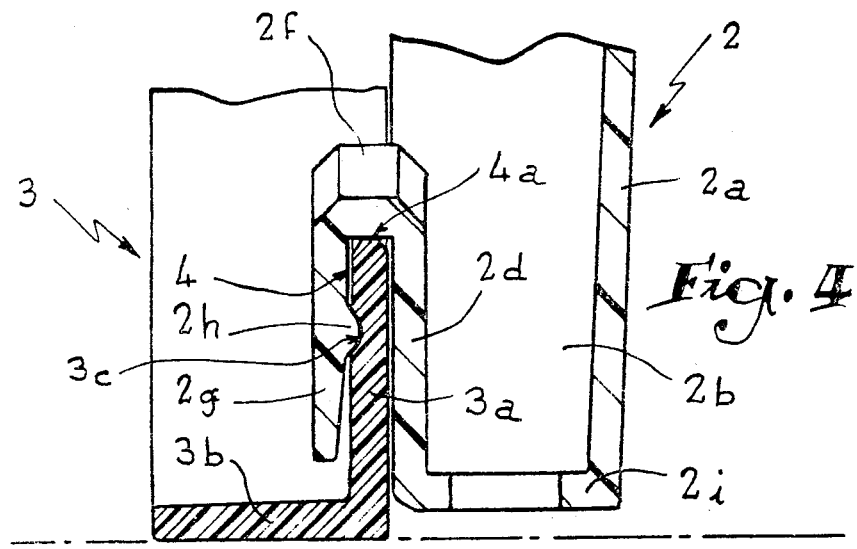

In order to secure a wheel in position, it suffices to subject it to an upward translation in the direction of arrow F (FIGS. 2 and 3) so that the web 3a penetrates into notch 4. In this position, the inner edge of the web comes into contact with the upper portion 4a of the notch 4. The inner face of flange 2g includes a lug 2h which projects into notch 4 so that, when wheel 3 is placed in position in this notch, the lug will be resiliently engaged in groove 3c of wheel 3 due to the elasticity of the flange 2g which is flexed outwardly upon the passage of web 3a. Each wheel is therefore maintained in mounted position within a notch so that the frame 1 may be raised without the wheels being displaced from the legs 2.

The wheels are withdrawn by exerting a force in the direction opposite that of arrow F after the frame is raised so as to allow the removal of webs 3a from the notches 4. The height of the webs 3a of the wheels 3 is such that the rims 3b which are associated therewith project beyond or at the least are flush with the bottom of the legs 2 which are closed on their sides by tabs 2i.

It must, moreover, be understood that the foregoing description has been given only by way of example and that it in no way limits the domain of the invention which would not be exceeded by replacing the details of execution described by any other equivalents.

What is claimed is:

1. A removable wheel support assembly for article supports wherein the article support includes a frame portion and at least one depending leg member comprising said leg member having a base portion and outer vertically oriented wall portions, a partition extending outwardly from said vertically oriented wall portions, a depending flange connected to said partition and spaced outwardly and in generally parallel relationship to said vertically oriented wall portions so as to create a notch therebetween, a wheel selectively mountable within said notch, said wheel having an outer peripheral surface and an inner annular and vertically oriented web which defines an opening through said wheel, said annular web being of a width to be cooperatively and removably received within said notch so that said wheel is oriented so as to rotate within said notch and around an axis of rotation which extends generally perpendicularly between said depending flange and said leg member, and said wheel being of a diameter so that the peripheral surface thereof extends downwardly so as to be aligned with or extends beyond said base portion of said leg member when said wheel is mounted within said notch.

2. The wheel support assembly of claim 1 in which said annular web of said wheel includes a generally circular inner edge which is defined having a first radius of curvature, said partition means having a lowermost convex edge being defined by a second radius of curvature, said second radius of curvature being less than said first radius of curvature.

3. The wheel support assembly of claim 1 in which said peripheral portion of said wheel extends generally perpendicularly with respect to said web.

4. The wheel support assembly of claim 1 including an annular groove formed in said annular web, and means protruding within said notch for selectively engaging said groove in said annular web so as to frictionally retain said wheel within said notch.

5. The wheel support assembly of claim 4 in which said depending flange portion is resiliently movable with respect to said vertically oriented wall portions of said leg member.

6. The wheel support assembly of claim 1 in which said vertically oriented wall portions of said leg member include a pair of vertically extending and opposing flange members which are mounted perpendicularly and outwardly with respect to the frame portion and which are divergent from one another upwardly from said base portion of the leg member, said opposing flange members defining an opening therebetween which is of a size to selectively receive the leg member of another article support so that the article supports may be stacked in vertical relationship with respect to one another.

7. In an article of furniture having a frame and at least one depending leg member the improvement comprising, said leg member having a base portion and a pair of vertically oriented and outwardly diverging flange members which extend upwardly of said base portion, an elongated opening defined between said flange members of a size to permit the leg member of another article of furniture to be cooperatively received therein so that such articles of furniture may be stacked vertically with respect to one another, a wheel, said wheel being defined by an outer peripheral surface and having an inner annular web defining an opening through said wheel, a flange member mounted to said leg member and extending outwardly and downwardly in parallel relationship adjacent to said leg member so as to create a notch therebetween, said web portion of said wheel being selectively receivable within said notch so that said leg member is rotatably supported on said wheel.

8. The improvement in an article of furniture of claim 7 including means for securing said wheel within said notch.

* * * * *